United States Patent
Matzkovits et al.

(10) Patent No.: US 10,451,397 B2
(45) Date of Patent: Oct. 22, 2019

(54) LINEAR GUIDE FOR A COORDINATE MEASURING MACHINE, AND A COORDINATE MEASURING MACHINE

(71) Applicant: CARL ZEISS INDUSTRIELLE MESSTECHNIK GMBH, Oberkochen (DE)

(72) Inventors: Berthold Matzkovits, Gerstetten (DE); Roland Brenner, Wallhausen (DE); Heinz Broghammer, Zimmern-Flözlingen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 159 days.

(21) Appl. No.: 15/786,647

(22) Filed: Oct. 18, 2017

(65) Prior Publication Data

US 2018/0120077 A1 May 3, 2018

(30) Foreign Application Priority Data

Oct. 28, 2016 (DE) ........................ 10 2016 221 260

(51) Int. Cl.
*G01B 5/008* (2006.01)
*G01B 5/00* (2006.01)
*G01B 21/04* (2006.01)

(52) U.S. Cl.
CPC ........... *G01B 5/0009* (2013.01); *G01B 5/008* (2013.01); *G01B 21/047* (2013.01)

(58) Field of Classification Search
CPC .............................. G01B 5/008; G01B 21/047
USPC ........................................................ 33/503
See application file for complete search history.

(56) References Cited

U.S. PATENT DOCUMENTS

| 5,551,163 A * | 9/1996 | Affa ................... G01D 5/34761 33/702 |
| 6,430,828 B1 * | 8/2002 | Ulbrich ................. G01B 7/012 33/503 |
| 9,109,747 B2 | 8/2015 | Schernthaner |
| 2012/0084989 A1 | 4/2012 | Pettersson et al. |
| 2014/0105716 A1 | 4/2014 | Lee et al. |
| 2014/0222372 A1 * | 8/2014 | Sprenger ................ G01B 5/008 702/155 |

(Continued)

FOREIGN PATENT DOCUMENTS

| CN | 200967136 Y | 10/2007 |
| CN | 201833188 U | 5/2011 |

(Continued)

OTHER PUBLICATIONS

Dossier Maschinenelemente; Grosse Massen pfeilschnell bewegen; Schneeberger AG, Roggwil (Schweiz), Technische Rundschau; Feb. 2013; 1 page.

(Continued)

*Primary Examiner* — George B Bennett
(74) *Attorney, Agent, or Firm* — Harness, Dickey & Pierce, P.L.C.

(57) ABSTRACT

A linear guide for a coordinate measuring machine. The linear guide comprises at least one plate-shaped main body and at least one guide rail. The plate-shaped main body has a material with a first coefficient of thermal expansion. The at least one guide rail has a material with a second coefficient of thermal expansion, which differs from the first coefficient of thermal expansion. The guide rail is connected to the plate-shaped main body, and arranged in a neutral axis of the plate-shaped main body.

15 Claims, 1 Drawing Sheet

(56) References Cited

U.S. PATENT DOCUMENTS

| | | | | |
|---|---|---|---|---|
| 2015/0131697 A1* | 5/2015 | Sakai | ............... | G01B 21/045 |
| | | | | 374/56 |
| 2015/0176956 A1* | 6/2015 | Pettersson | ............ | G01B 21/04 |
| | | | | 33/503 |
| 2016/0102958 A1* | 4/2016 | Fischer | ............. | G01B 3/1061 |
| | | | | 33/707 |
| 2016/0146641 A1* | 5/2016 | Bauer | ............. | G01D 5/34715 |
| | | | | 33/706 |
| 2016/0178362 A1* | 6/2016 | Iseli | ............ | G01B 5/008 |
| | | | | 33/503 |
| 2019/0145764 A1* | 5/2019 | Atherton | ............ | G01B 21/047 |

FOREIGN PATENT DOCUMENTS

| | | |
|---|---|---|
| CN | 201983775 U | 9/2011 |
| CN | 103730398 A | 4/2014 |
| CN | 104483891 A | 4/2015 |
| DE | 10 2014 212 748 A1 | 1/2016 |
| DE | 10 2016 201 922 A1 | 8/2017 |
| WO | WO-2015153325 A1 | 10/2015 |
| WO | 2016/001050 A1 | 1/2016 |

OTHER PUBLICATIONS https://de.wikipedia.org/w/index.php?title+Neutrale_Faser&oldid=157870223.

Zeiss Contura® Technische Daten (English language translation attached); Nov. 2017; 15 pp.

English translation of German Office Action for Appl'n No. 10 2016 221 260.5; dated Nov. 23, 2017; 8 pp.

English translation of Chinese Office Action for Appl'n No. 201711022934.5; dated Jul. 2, 2019; 11 pp.

\* cited by examiner

LINEAR GUIDE FOR A COORDINATE MEASURING MACHINE, AND A COORDINATE MEASURING MACHINE

CROSS-REFERENCE TO RELATED APPLICATION

This application claims priority from German patent application DE 10 2016 221 260.5, filed on Oct. 28, 2016. The entire content of this prior application is incorporated herein by reference.

BACKGROUND OF THE INVENTION

The invention relates to a linear guide for a coordinate measuring machine, and to a coordinate measuring machine.

The prior art has disclosed various linear guides for a coordinate measuring machine for measuring workpieces. Such coordinate measuring machines may be designed as portal-type measuring machines. Portal-type measuring machines comprise a portal which has two vertical columns and a cross beam which connects the two columns in an upper region, which portal is mounted, so as to be movable in a horizontal direction, on a main body for supporting the workpiece to be measured. A measuring slide is mounted so as to be movable along the cross beam, in which measuring slide there is mounted a quill, which is movable in a vertical direction. On a lower end of the quill there is arranged a sensor, in particular a tactile sensor, by means of which a surface of the workpiece can be probed. By means of the described portal mechanism, the sensor can be moved in all coordinate directions x, z, y relative to the workpiece to be measured.

Guidance of the portal, for example along a y axis, may be realized by means of one or more linear guides. A linear guide of said type is presented for example in U.S. Pat. No. 9,109,747 B2. A linear movement device is described which has a base with a surface for supporting one or more workpieces and an instrument. The instrument is arranged so as to be movable relative to the base by means of a multiplicity of guide rails, such that a movement of the instrument relative to the base along three axes is made possible. At least one of the guide rails comprises an elongate guide rail element which is composed of a multiplicity of elongate, basically planar, web elements. Each of the web elements has a length and has a pair of oppositely situated side edges which run along the length. The web elements are connected to one another at at least one or more of the side edges in order to form the elongate guide rail element. The guide rail element comprises a ceramic material.

It is also known from the prior art to use fluid pressure bearings, in particular air bearings, as a guide, which fluid pressure bearings run on the main body, for example on a granite plate that has been machined with high precision. Such solutions permit exact measurement results in the measurement of the workpiece. Such air bearings can however accommodate a force only in one direction, such that, for example for the guidance along the y axis, a multiplicity of air bearings and high-precision surfaces may be required. Such solutions can thus lead to high outlay in terms of apparatus and high costs. Furthermore, air bearings can exhibit very soft characteristics in the presence of dynamic forces such as can arise for example during an acceleration of the portal. In particular in the presence of contaminated ambient air, for example owing to contaminants in a workshop area such as oil mist and metal dust, this can lead to a high level of wear and to failures.

Also known from the prior art are portal-type measuring machines which have a main body composed of cast iron, to which there are attached linear guides in the form of recirculating ball guides. Such guides can exhibit a high level of stiffness even in the presence of dynamic forces. Recirculating ball guides are furthermore considerably less sensitive to contaminants than air bearing guides, for example.

The use of a main body composed of granite may however be advantageous in relation to cast iron, because granite exhibits less thermal expansion and has a high mass and is constant in terms of shape and dimensions, in particular is not subject to any ageing processes. Recirculating ball guides are however generally manufactured from steel. The coefficient of thermal expansion of steel however differs considerably from the coefficient of thermal expansion of granite, such that bending of the granite plate in the region of the guide, and thus inaccurate measurements, can occur.

It is therefore an object of the present invention to provide a linear guide and a coordinate measuring machine which at least substantially avoid the disadvantages of known systems. In particular, it is sought to make possible a high level of stiffness, low thermal expansion with simultaneous insensitivity, in particular suitability for workshop environments.

BRIEF SUMMARY OF THE INVENTION

This object is achieved by means of a linear guide and a coordinate measuring machine having the features of the independent patent claims. Advantageous refinements, which may be realized individually or in combination, are presented in the dependent claims.

Below, the expressions "exhibit", "have", "comprise" or "include" or any grammatical variants thereof are used in a non-exclusive manner. Accordingly, such expressions may refer both to situations in which no further features are provided in addition to the features introduced by such expressions, or to situations in which one or more further features are provided. For example, the expression "A exhibits B", "A has B", "A comprises B" or "A includes B" may refer both to the situation in which no further element aside from B is provided in A (that is to say to a situation in which A is composed exclusively of B) and to the situation in which, in addition to B, one or more further elements are provided in A, for example element C, elements C and D, or even further elements.

It is furthermore pointed out that the expressions "at least one" and "one or more" and grammatical variants of such expressions or similar expressions, where used in conjunction with one or more elements or features and intended to express that the element or feature may be provided singly or multiply, are generally used only once, for example when the feature or element is introduced for the first time. When the feature or element is mentioned again later, the corresponding expression "at least one" or "one or more" will generally no longer be used, without restriction of the possibility that the feature or element may be provided singly or multiply.

Furthermore, below, the expressions "preferably", "in particular", "for example" or similar expressions will be used in conjunction with optional features, without alternative embodiments hereby being restricted. Accordingly, features introduced by such expressions are optional features, and it is not intended to restrict the scope of protection of the claims, and in particular of the independent claims, by means of such features. Accordingly, as a person skilled in the art will identify, the invention may also be implemented using other refinements. Similarly, features introduced by "in one embodiment of the invention" or "in one exemplary embodiment of the invention" are to be understood to be optional features, without this being intended to restrict alternative refinements or the scope of protection of the independent claims. Furthermore, it is the intention that all possibilities of combining the features hereby introduced with other features, whether these be optional or non-optional features, remain unaffected by such introductory expressions.

In a first aspect of the present invention, a linear guide for a coordinate measuring machine is proposed. A linear guide may be understood generally to mean a mechanical guide element which is designed to move a first component, for example a portal and/or a column of a portal, with respect to a second component, for example a plate-shaped main body, along an axis, in particular on a straight line. The linear guide may be designed to move the first component linearly with respect to the second component. The linear guide may basically be used in a variety of devices in the field of mechanical engineering, for example in machine tools, milling machines or coordinate measuring machines. In the context of the present invention, the linear guide will be described in the context of a coordinate measuring machine. Other fields of use are however also conceivable.

The linear guide comprises:
  at least one plate-shaped main body, wherein the plate-shaped main body has a material with a first coefficient of thermal expansion;
  at least one guide rail which has a material with a second coefficient of thermal expansion, wherein the first coefficient of thermal expansion differs from the second coefficient of thermal expansion, wherein the guide rail is connected to the plate-shaped main body.

A plate-shaped main body may be understood generally to mean a cuboid with a rectangular base surface, on which further components of the linear guide are arranged. The plate-shaped main body may have at least one supporting surface for supporting a workpiece. The supporting surface may be a rectangular supporting surface, which is substantially planar. The supporting surface may preferably be completely planar, though small deviations from planarity are conceivable. In particular, the plate-shaped main body may be a measuring table of a coordinate measuring machine.

A guide rail may be understood generally to mean a component along which one or more guide carriages run. In particular, the guide rail may be a straight and/or linear rail. The linear guide may have at least one guide carriage, for example a running carriage and/or slide, which is designed to run in or on the guide rail. The linear guide may have a guide selected from the group comprising: a recirculating ball guide, a recirculating roller guide. For example, the linear guide may have a profiled-rail guide with a profiled rail and with at least one running carriage which has, for example, at least two or four ball or roller circuits. For example, the linear guide may have a cage-type rail guide. Other rail guides are basically also conceivable.

The expressions "first" and "second" coefficient of thermal expansion are merely designations and do not provide any information regarding a sequence and regarding whether the plate-shaped main body and/or the guide rail have further materials with further coefficients of thermal expansion. A coefficient of thermal expansion, also referred to as thermal expansion coefficient, may generally be understood to mean a measure of a behavior of a material with regard to changes in its dimensions in the event of temperature changes. The first coefficient of thermal expansion differs from the second coefficient of thermal expansion. The material of the plate-shaped main body may exhibit different thermal expansion than the material of the guide rail. The plate-shaped main body may be composed entirely of the material with the first thermal coefficient. The material of the plate-shaped main body may be selected from the group comprising: granite, polymer concrete/mineral cast, ceramic. The plate-shaped main body may be a granite plate. For example, the thermal coefficient $\alpha$ of the material of the plate-shaped main body may lie between $4\cdot10^{-6}/K$ and $7\cdot10^{-6}/K$. The guide rail may be composed entirely of the material with the second thermal coefficient. For example, the thermal coefficient $\alpha$ of the material of the guide rail may lie between $10\cdot10^{-6}/K$ and $14\cdot10^{-6}/K$. The material of the guide rail may be steel. For example, the thermal coefficient $\alpha$ of the material of the guide rail may be $12\cdot10^{-6}/K$.

The guide rail is connected to the plate-shaped main body. The expression "connected" may be understood to mean a detachable or non-detachable connection of the guide rail and the plate-shaped main body. In particular, the guide rail may be fastened to the plate-shaped main body. The guide rail may be connected to the plate-shaped main body by means of at least one connection selected from the group comprising: a non-positively locking connection, a positively locking connection, a cohesive connection. The connection may have at least one screw connection and/or at least one adhesive connection, for example using an adhesive and/or cement, and/or at least one clamping connection. The connection may be a direct connection, or further elements may be arranged between the plate-shaped main body and the guide rail, for example one or more spacer sheets.

The guide rail is arranged in a neutral axis of the plate-shaped main body. A neutral axis, also referred to as zero line, may be understood to mean that axis or layer of a cross section, for example along a z axis, of the plate-shaped main body whose length does not change in the event of twisting or bending, in particular about an x axis. The plate-shaped main body may have at least one coordinate system, for example a Cartesian coordinate system. The plate-shaped main body may have at least one side surface which extends along a y axis. As stated above, the plate-shaped main body may have at least one supporting surface. The supporting surface may extend perpendicular to the y axis. An x axis may run perpendicular to the y axis in a plane of the supporting surface of the plate-shaped main body. A z axis may extend perpendicular to the plane of the supporting surface, in a vertical direction. The neutral axis may be a neutral axis with regard to bending about the x axis. For example, the linear guide may extend horizontally along the y axis. The neutral axis may extend through a geometrical centroid of the cross-sectional area. The plate-shaped main body may have at least one side surface which is rectangular and substantially planar. The side surface may have a height h. A height may be understood to mean an extent along the z axis. The guide rail may be arranged on the side surface of the plate-shaped main body at a height of between 0.4 h and 0.6 h, preferably at 0.5 h. The guide rail may be arranged at a height of 0.5 h, wherein tolerances of ±20% are possible. For example, in the case of a plate with a rectangular cross section, the guide rail may be arranged at 0.5 h. The guide rail may be arranged at the midpoint of the height of the plate-shaped main body. The guide rail may be arranged such that, in the presence of thermally induced stress between the plate-shaped main body and the guide rail as a result of different thermal expansion of the material of the plate-shaped main body and of the material of the guide rail, no moment is generated about the x axis. It is thus possible to prevent bending occurring in the direction of the z axis. The neutral axis may in particular be free from forces.

In the presence of a thermally induced stress between the plate-shaped main body and the guide rail, a moment may be generated about the z axis. The plate-shaped main body may have such a large extent along the x axis that the plate-shaped main body has a high second moment of area about the z axis, such that said moment about the z axis leads to a very low degree of bending, which has no effect, or scarcely any effect, on an accuracy of the machine.

In a further aspect, in the context of the present invention, a coordinate measuring machine comprising at least one linear guide is proposed. The linear guide has at least one plate-shaped main body. The plate-shaped main body has a material with a first coefficient of thermal expansion. The linear guide has at least one guide rail which has a material with a second coefficient of thermal expansion. The first coefficient of thermal expansion differs from the second coefficient of thermal expansion. The guide rail is connected to the plate-shaped main body. The guide rail is arranged in a neutral axis of the plate-shaped main body.

The linear guide may be designed in accordance with one of the embodiments described above. For details and definitions with regard to the coordinate measuring machine, reference is made to the description of the linear guide.

The coordinate measuring machine may be a portal-type measuring machine or a bridge-type measuring machine. The plate-shaped main body may be a measuring table of the coordinate measuring machine. The plate-shaped main body may have at least one supporting surface for supporting at least one workpiece. The plate-shaped main body may have at least one side surface with a height h, wherein the guide rail is arranged on the side surface at a height of between 0.4 h and 0.6 h, preferably at 0.5 h.

The coordinate measuring machine may have at least one portal which has at least one first vertical column, at least one second vertical column and a cross beam which connects the first vertical column and the second vertical column. At least one vertical column selected from the first and second vertical columns may be mounted on the plate-shaped main body so as to be movable in a horizontal direction by means of the linear guide. The horizontal direction may be a direction along a y axis. The coordinate measuring machine may have a coordinate system, for example a Cartesian coordinate system or a spherical coordinate system. Other coordinate systems are also conceivable. An origin or zero point of the coordinate system may be defined for example by a sensor of the coordinate measuring machine. For example, the linear guide may extend horizontally along the y axis and be designed to move the portal and/or the at least one column of the portal linearly along the y axis. An x axis may run perpendicular to the y axis in a plane of the supporting surface of the plate-shaped main body. A z axis may extend perpendicular to the plane of the supporting surface, in a vertical direction. The vertical columns may extend along the z axis. The cross beam may extend along the x axis.

In one embodiment, on an end of the other vertical column, there may be arranged at least one fluid pressure bearing, for example at least one air bearing, which is designed to accommodate a pressure acting vertically on the fluid pressure bearing. The cross beam may connect the vertical columns at another end.

In one embodiment, the first vertical column and the second vertical column may be mounted on the plate-shaped main body so as to be movable in the horizontal direction by means of the linear guide.

The coordinate measuring machine may have at least one measuring slide which is mounted so as to be movable along the cross beam. A measuring slide may be understood generally to mean a slide which is designed to accommodate at least one sensor directly or via further components. In the measuring slide there may be mounted a quill which is movable in a vertical direction, for example along the z axis. On a lower end, in particular an end pointing in the direction of the supporting surface, of the quill, there may be arranged a sensor, for example a tactile sensor, by means of which a surface of the workpiece can be probed. Here, in the context of the present invention, a workpiece may be understood generally to mean an arbitrarily shaped object to be measured.

The linear guide may be operated and/or set and/or adjusted manually and/or automatically. The coordinate measuring machine, in particular the linear guide, may have at least one drive, for example at least one motor. The coordinate measuring machine may have a control unit which is designed to actuate the linear guide, in particular the drive of the linear guide, and move it along the horizontal direction. For example, the controller may have at least one regulator which is designed to regulate the drive, for example a drive of a guide carriage. The controller may furthermore comprise at least one interface, for example an electronic interface and/or a human-machine interface, such as for example an input/output device such as a display and/or a keyboard and/or an operating console.

The coordinate measuring machine may be designed to probe the workpiece, in particular a surface of the workpiece, by means of the sensor through movement of the portal and/or of the measuring slide and/or of the quill in all three spatial directions. The sensor may for example comprise at least one probe head, for example at least one probe sphere. The sensor may be designed to generate at least one signal, for example an electronic signal. The coordinate measuring machine may furthermore have at least one evaluation unit which is designed to evaluate the signal generated by the sensor and to generate, from the signal, at least one item of information regarding a measurement point on the surface of the workpiece. An item of information regarding the measurement point may basically be understood to mean any item of information regarding the measurement point, for example a position and/or coordinates in the coordinate system of the sensor. For example, for this purpose, one or more electronic connections may be provided between the sensor and the evaluation unit. The evaluation unit may for example comprise at least one data processing device, for example at least one computer or microcontroller. The data processing device may have one or more volatile and/or non-volatile data memories, wherein the data processing device may for example be set up, in terms of programming technology, to actuate the sensor. The evaluation unit may be part of the controller.

In summary, in the context of the present invention, the following embodiments are particularly preferred:

Embodiment 1

Linear guide for a coordinate measuring machine, comprising:

at least one plate-shaped main body, wherein the plate-shaped main body has a material with a first coefficient of thermal expansion;

at least one guide rail which has a material with a second coefficient of thermal expansion, wherein the first coefficient of thermal expansion differs from the second coefficient of thermal expansion, wherein the guide rail is connected to the plate-shaped main body, wherein the guide rail is arranged in a neutral axis of the plate-shaped main body.

Embodiment 2

Linear guide according to the preceding embodiment, wherein the plate-shaped main body has at least one side surface with a height h, wherein the guide rail is arranged on the side surface of the plate-shaped main body at a height of between 0.4 h and 0.6 h, preferably at 0.5 h.

Embodiment 3

Linear guide according to one of the preceding embodiments, wherein the plate-shaped main body has at least one coordinate system, wherein the plate-shaped main body has at least one side surface which extends along a y axis, wherein the plate-shaped main body has at least one supporting surface which extends perpendicular to the y axis, wherein an x axis extends perpendicular to the y axis in a plane of the supporting surface, wherein the neutral axis is a neutral axis with regard to bending about the x axis.

Embodiment 4

Linear guide according to one of the preceding embodiments, wherein the linear guide has at least one guide carriage which is designed to run on the guide rail.

Embodiment 5

Linear guide according to one of the preceding embodiments, wherein the material of the plate-shaped main body is selected from the group comprising: granite, polymer concrete/mineral cast, ceramic.

Embodiment 6

Linear guide according to one of the preceding embodiments, wherein the material of the guide rail is steel.

Embodiment 7

Linear guide according to one of the preceding embodiments, wherein the guide rail is connected to the plate-shaped main body by means of at least one connection selected from the group comprising: a non-positively locking connection, a positively locking connection, a cohesive connection.

Embodiment 8

Linear guide according to one of the preceding embodiments, wherein the connection has at least one screw connection and/or at least one adhesive connection and/or at least one clamping connection.

Embodiment 9

Linear guide according to one of the preceding embodiments, wherein the linear guide has at least one guide selected from the group comprising: a recirculating ball guide, a recirculating roller guide.

Embodiment 10

Coordinate measuring machine comprising at least one linear guide, wherein the linear guide has at least one plate-shaped main body, wherein the plate-shaped main body has a material with a first coefficient of thermal expansion, wherein the linear guide has at least one guide rail which has a material with a second coefficient of thermal expansion, wherein the first coefficient of thermal expansion differs from the second coefficient of thermal expansion, wherein the guide rail is connected to the plate-shaped main body, wherein the guide rail is arranged in a neutral axis of the plate-shaped main body.

Embodiment 11

Coordinate measuring machine according to the preceding embodiment, wherein the linear guide is designed according to one of the preceding embodiments relating to a linear guide.

Embodiment 12

Coordinate measuring machine according to one of the preceding embodiments relating to a coordinate measuring machine, wherein the coordinate measuring machine is a portal-type measuring machine or a bridge-type measuring machine.

Embodiment 13

Coordinate measuring machine according to one of the preceding embodiments relating to a coordinate measuring machine, wherein the plate-shaped main body has at least one supporting surface for supporting at least one workpiece, wherein the plate-shaped main body has at least one side surface with a height h, wherein the guide rail is arranged on the side surface at a height between 0.4 h and 0.6 h, preferably at 0.5 h.

Embodiment 14

Coordinate measuring machine according to one of the preceding embodiments relating to a coordinate measuring machine, wherein the coordinate measuring machine has at least one portal which has at least one first vertical column, at least one second vertical column and a cross beam which connects the first vertical column and the second vertical column, wherein at least one vertical column selected from the first vertical column and second vertical column is mounted on the plate-shaped main body so as to be movable in a horizontal direction by means of the linear guide.

Embodiment 15

Coordinate measuring machine according to the preceding embodiment, wherein, on an end of the other vertical column, there is arranged at least one fluid pressure bearing which is designed to accommodate a pressure acting vertically on the fluid pressure bearing.

Embodiment 16

Coordinate measuring machine according to one of the two preceding embodiments, wherein the first vertical column and the second vertical column are mounted on the plate-shaped main body so as to be movable in the horizontal direction by means of the linear guide.

Embodiment 17

Coordinate measuring machine according to one of the three preceding embodiments, wherein the coordinate measuring machine has at least one measuring slide which is mounted so as to be movable along the cross beam, wherein a quill which is movable in a vertical direction is mounted on the measuring slide, wherein a sensor is arranged on the lower end of the quill.

Further details and advantages of the invention will become apparent from the following description of preferred exemplary embodiments, in particular in conjunction with the subclaims. Here, the respective features may be realized individually or severally in combination with one another. The invention is not restricted to the exemplary embodiments. The exemplary embodiments are illustrated schematically in the figures. Here, identical reference designations in the individual figures denote identical or functionally identical elements, or elements which correspond to one another in terms of their functions.

DETAILED DESCRIPTION OF THE PREFERRED EMBODIMENTS

Figure 1:
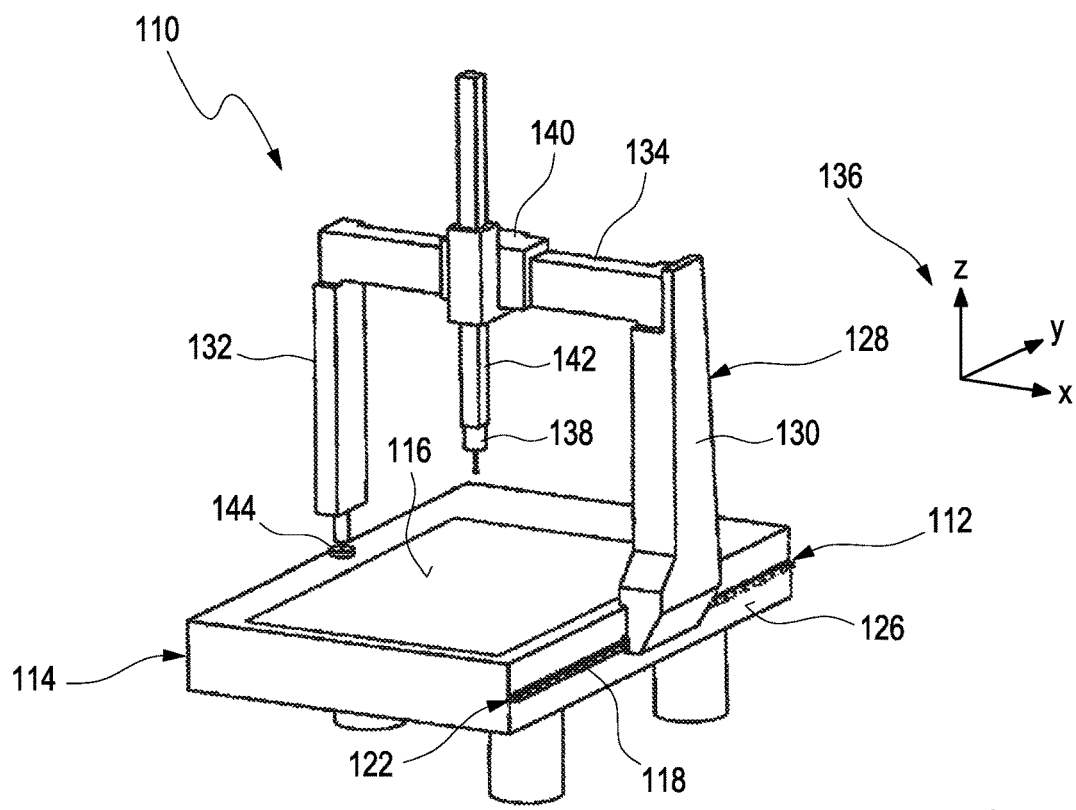
FIG. 1 shows a schematic illustration of an exemplary embodiment of a coordinate measuring machine according to the invention.

FIG. 1 shows a schematic illustration of an exemplary embodiment of a coordinate measuring machine 110 according to the invention. The coordinate measuring machine 110 may be designed as a portal-type measuring machine. The coordinate measuring machine 110 comprises at least one linear guide 112. The linear guide 112 has at least one plate-shaped main body 114. The plate-shaped main body 114 may have at least one supporting surface 116 for supporting a workpiece (not illustrated). The supporting surface 116 may be a rectangular supporting surface, which is substantially planar. In particular, the plate-shaped main body 114 may be a measuring table of a coordinate measuring machine 110.

The plate-shaped main body 114 has a material with a first coefficient of thermal expansion. The plate-shaped main body 114 may be composed entirely of the material with the first thermal coefficient. The material of the plate-shaped main body 114 may be selected from the group comprising: granite, polymer concrete/mineral cast, ceramic. The plate-shaped main body 114 may be a granite plate. For example, the thermal coefficient $\alpha$ of the material of the plate-shaped main body 114 may lie between $4 \cdot 10^{-6}/K$ and $7 \cdot 10^{-6}/K$.

The linear guide 112 has at least one guide rail 118 which has a material with a second coefficient of thermal expansion. The first coefficient of thermal expansion differs from the second coefficient of thermal expansion. The material of the plate-shaped main body 114 may exhibit different thermal expansion than the material of the guide rail 118. The guide rail 118 may be composed entirely of the material with the second thermal coefficient. The material of the guide rail 118 may be steel. For example, the thermal coefficient $\alpha$ of the material of the guide rail 118 may be 12.10-6/K.

Figure 2:
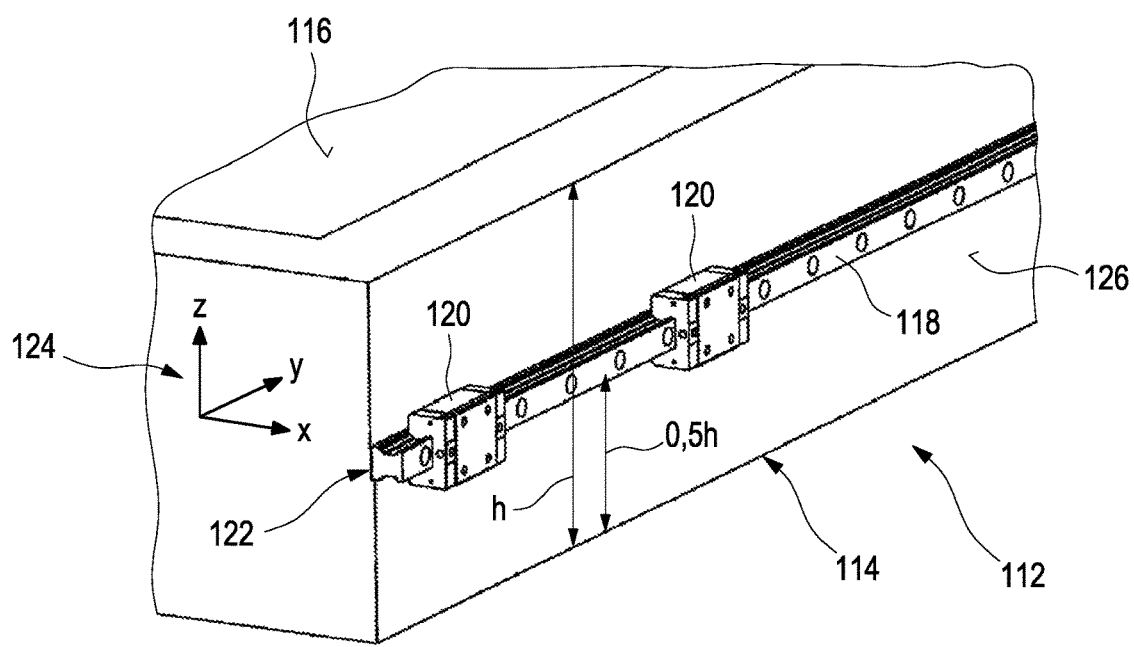
FIG. 2 shows an enlarged detail of the exemplary embodiment.

The guide rail 118 is connected to the plate-shaped main body 114. FIG. 2 shows an enlarged detail of the linear guide 112. The guide rail 118 may be a straight and/or linear rail. The linear guide 112 may have at least one guide carriage 120, for example a running carriage and/or slide, which is designed to run in or on the guide rail 118. In the exemplary embodiment shown in FIG. 1, the linear guide 112 may have a recirculating ball guide. For example, the linear guide 112 may have a profiled-rail guide with a profiled rail and with at least one running carriage which has, for example, at least two or four ball or roller circuits. Other rail guides are however basically also conceivable.

The guide rail 118 may be fastened to the plate-shaped main body 114. The guide rail 118 may be connected to the plate-shaped main body 114 by means of at least one connection selected from the group comprising: a non-positively locking connection, a positively locking connection, a cohesive connection. The connection may have at least one screw connection and/or at least one adhesive connection, for example using an adhesive and/or cement, and/or at least one clamping connection.

The guide rail 118 is arranged in a neutral axis 122 of the plate-shaped main body 114. The plate-shaped main body 114 may have at least one coordinate system 124. The plate-shaped main body 114 may have at least one side surface 126 which extends along a y axis. As stated above, the plate-shaped main body 114 may have at least one supporting surface 116. The supporting surface 116 may extend perpendicular to the y axis. An x axis may run perpendicular to the y axis in a plane of the supporting surface 116 of the plate-shaped main body 114. A z axis may extend perpendicular to the plane of the supporting surface 116, in a vertical direction. The neutral axis may be a neutral axis with regard to bending about the x axis. For example, the linear guide may extend horizontally along the y axis. The neutral axis 122 may run through a geometrical centroid of a cross section, for example along a z axis. The side surface 126 may have a height h. The guide rail 118 may be arranged on the side surface 126 of the plate-shaped main body 114 at a height of between 0.4 h and 0.6 h, preferably at 0.5 h. The guide rail 118 may be arranged at the midpoint of the height of the plate-shaped main body 114. The guide rail 118 may be arranged such that, in the presence of thermally induced stress between the plate-shaped main body 114 and the guide rail 118 as a result of different thermal expansion of the material of the plate-shaped main body 114 and of the material of the guide rail 118, no moment is generated about the x axis. It is thus possible to prevent bending occurring in the direction of the z axis. The neutral axis 122 may in particular be free from forces.

In the exemplary embodiment shown in FIG. 1, the coordinate measuring machine 110 has at least one portal 128 which has at least one first vertical column 130, at least one second vertical column 132 and a cross beam 134 which connects the first vertical column 130 and the second vertical column 132. In FIG. 1, the first vertical column 130 is mounted on the plate-shaped main body 114 so as to be movable in a horizontal direction by means of the linear guide 112. The coordinate measuring machine 110 may have a coordinate system 136 which is for example identical to the coordinate system 124 of the plate-shaped main body 114. An origin or zero point of the coordinate system 136 may be defined for example by a sensor 138 of the coordinate measuring machine 110. For example, the linear guide 112 may extend horizontally along the y axis and be designed to move the portal 128 and/or the at least one vertical column 130, 132 of the portal 128 linearly along the y axis. An x axis may run perpendicular to the y axis in a plane of the supporting surface 116 of the plate-shaped main body 114. A z axis may extend perpendicular to the plane of the supporting surface 116, in a vertical direction. The vertical columns 130, 132 may extend along the z axis. The cross beam 134 may extend along the x axis.

In FIG. 1, on an end of the vertical column 132, there is arranged at least one fluid pressure bearing 138, for example at least one air bearing, which is designed to accommodate a pressure acting vertically on the fluid pressure bearing 138. The cross beam 134 may connect the vertical columns 130, 132 at another end.

The coordinate measuring machine 110 may have at least one measuring slide 140 which is mounted so as to be movable along the cross beam 134. In the measuring slide 140 there may be mounted a quill 142 which is movable in a vertical direction, for example along the z axis. On a lower end, in particular an end pointing in the direction of the supporting surface 116, of the quill 142, there may be arranged the sensor 138, for example a tactile sensor, by means of which a surface of the workpiece can be probed.

The linear guide 112 may be operated and/or set and/or adjusted manually and/or automatically. The coordinate measuring machine 110, in particular the linear guide 112, may have at least one drive (not illustrated here), for example at least one motor. The coordinate measuring machine 110 may have a control unit (not shown in the figures) which is designed to actuate the linear guide 112, in particular the drive of the linear guide 112, and move it along the horizontal direction. For example, the controller may have at least one regulator which is designed to regulate the drive, for example a drive of a guide carriage. The controller may furthermore comprise at least one interface, for example an electronic interface and/or a human-machine interface, such as for example an input/output device such as a display and/or a keyboard and/or an operating console.

The coordinate measuring machine 110 may be designed to probe the workpiece, in particular a surface of the workpiece, by means of the sensor 138 through movement of the portal 128 and/or of the measuring slide 140 and/or of the quill 142 in all three spatial directions. The sensor 138 may for example comprise at least one probe head, for example at least one probe sphere. The sensor 138 may be designed to generate at least one signal, for example an electronic signal. The coordinate measuring machine 110 may furthermore have at least one evaluation unit (not illustrated in the figures) which is designed to evaluate the signal generated by the sensor 138 and to generate, from the signal, at least one item of information regarding a measurement point on the surface of the workpiece. For example, for this purpose, one or more electronic connections may be provided between the sensor 138 and the evaluation unit. The evaluation unit may for example comprise at least one data processing device, for example at least one computer or microcontroller. The data processing device may have one or more volatile and/or non-volatile data memories, wherein the data processing device may for example be set up, in terms of programming technology, to actuate the sensor 138. The evaluation unit may be part of the controller.

The invention claimed is:

1. Linear guide for a coordinate measuring machine, comprising:

at least one plate-shaped main body, wherein the plate-shaped main body has a material with a first coefficient of thermal expansion;

at least one guide rail which has a material with a second coefficient of thermal expansion, wherein the first coefficient of thermal expansion differs from the second coefficient of thermal expansion, wherein the guide rail is connected to the plate-shaped main body, and wherein the guide rail is arranged in a neutral axis of the plate-shaped main body.

2. Linear guide according to claim 1, wherein the plate-shaped main body has at least one side surface with a height h, wherein the guide rail is arranged on the side surface of the plate-shaped main body at a height of between 0.4 h and 0.6 h.

3. Linear guide according to claim 1, wherein the linear guide has at least one guide carriage which is designed to run on the guide rail.

4. Linear guide according to claim 1, wherein the material of the plate-shaped main body is selected from the group comprising: granite, polymer concrete/mineral cast, ceramic.

5. Linear guide according to claim 1, wherein the material of the guide rail is steel.

6. Linear guide according to claim 1, wherein the guide rail is connected to the plate-shaped main body by means of at least one connection selected from the group comprising: a non-positively locking connection, a positively locking connection, a cohesive connection.

7. Linear guide according to claim 1, wherein the guide rail is connected to the plate-shaped main body by means of at least one connection, and wherein the connection has at least one screw connection and/or at least one adhesive connection and/or at least one clamping connection.

8. Linear guide according to claim 1, wherein the linear guide has at least one guide selected from the group comprising: a recirculating ball guide, a recirculating roller guide.

9. Coordinate measuring machine comprising at least one linear guide, wherein the linear guide has at least one plate-shaped main body, wherein the plate-shaped main body has a material with a first coefficient of thermal expansion, wherein the linear guide has at least one guide rail which has a material with a second coefficient of thermal expansion, wherein the first coefficient of thermal expansion differs from the second coefficient of thermal expansion, wherein the guide rail is connected to the plate-shaped main body, and wherein the guide rail is arranged in a neutral axis of the plate-shaped main body.

10. Coordinate measuring machine according to claim 9, wherein the linear guide is designed according to claim 1.

11. Coordinate measuring machine according to claim 9, wherein the coordinate measuring machine is a portal-type measuring machine or a bridge-type measuring machine.

12. Coordinate measuring machine according to claim 9, wherein the plate-shaped main body has at least one supporting surface for supporting at least one workpiece, wherein the plate-shaped main body has at least one side surface with a height h, wherein the guide rail is arranged on the side surface at a height between 0.4 h and 0.6 h.

13. Coordinate measuring machine according to claim 9, wherein the coordinate measuring machine has at least one portal which has at least one first vertical column, at least one second vertical column and a cross beam which connects the first vertical column and the second vertical column, wherein at least one vertical column selected from the first vertical column and the second vertical column is mounted on the plate-shaped main body so as to be movable in a horizontal direction by means of the linear guide.

14. Coordinate measuring machine according to claim 13, wherein, on an end of the other vertical column, there is arranged at least one fluid pressure bearing which is designed to accommodate a pressure acting vertically on the fluid pressure bearing.

15. Coordinate measuring machine according to claim 13, wherein the first vertical column and the second vertical column are mounted on the plate-shaped main body so as to be movable in the horizontal direction by means of the linear guide.

* * * * *